(12) United States Patent
Reber et al.

(10) Patent No.: US 6,412,695 B1
(45) Date of Patent: Jul. 2, 2002

(54) OPTICAL CODE AND DELINEATOR APPARATUS AND METHOD

(75) Inventors: William L. Reber, Rolling Meadows; Christopher B. Galvin, Winnetka, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/544,950

(22) Filed: Apr. 7, 2000

(51) Int. Cl.$^7$ ................................................. G06K 7/10
(52) U.S. Cl. .............................. 235/462.07; 235/462.01
(58) Field of Search .................. 235/462.01, 462.02, 235/462.07, 462.24, 462.25

(56) References Cited

U.S. PATENT DOCUMENTS

| | | | |
|---|---|---|---|
| 4,889,367 A | * 12/1989 | Miller | 235/462.01 |
| 5,296,688 A | 3/1994 | Hamilton et al. | 235/375 |
| 5,440,110 A | 8/1995 | Brooks | 235/462 |
| 5,640,193 A | 6/1997 | Wellner | |
| 5,902,353 A | 5/1999 | Reber et al. | |
| 5,903,729 A | 5/1999 | Reber et al. | |
| 5,930,767 A | 7/1999 | Reber et al. | |
| 5,938,726 A | 8/1999 | Reber et al. | |
| 5,939,699 A | 8/1999 | Perttunen et al. | |
| 5,940,595 A | 8/1999 | Reber et al. | |
| 5,969,324 A | 10/1999 | Reber et al. | |
| 5,986,651 A | 11/1999 | Reber et al. | |
| 5,995,105 A | 11/1999 | Reber et al. | |
| 6,032,195 A | 2/2000 | Reber et al. | |

FOREIGN PATENT DOCUMENTS

EP      0851375      *  7/1998    ............ G06K/7/10

OTHER PUBLICATIONS

"Punched Codes to Bar Codes—A 200 Year Journal", Benjamin Nelson, 1997, Month.

* cited by examiner

Primary Examiner—Karl D. Frech
Assistant Examiner—Daniel St. Cyr
(74) Attorney, Agent, or Firm—Daniel W. Juffernbruch

(57) ABSTRACT

Data in the form of a machine readable optical code 10, such as a bar code, is combined with a delineator 11, which delineator is visible to the unaided human eye. The data includes at least some identifying information that identifies an information contact point.

31 Claims, 1 Drawing Sheet

OPTICAL CODE AND DELINEATOR APPARATUS AND METHOD

FIELD OF THE INVENTION

This invention relates generally to machine-readable optical codes.

BACKGROUND OF THE INVENTION

Optical codes such as bar codes and bar code scanners are well understood in the art. Bar codes, such as those found on consumer products, are typically intended for use by trained personnel. Bar codes have potential for use in other circumstances than prior art practice has allowed, but one significant inhibiting factor to such expanded usage involves the issue of training or knowledge on the part of the user. There exists a need for a way of presenting an optical code that will avoid, in whole or in part, such problems.

DESCRIPTION OF THE PREFERRED EMBODIMENT

Figure 1:
FIG. 1 comprises a top plan view of an optical code configured in accordance with one embodiment of the invention.

Referring now to the drawings, FIG. 1 depicts an optical code 10 (in this case, a bar code) in accordance with well understood prior art technique. The optical code 10 depicts data. This data can include various items of information, but it shall at least include some identifying information that identifies an information contact point. For example, the data might comprise all or part of a universal resource locator for a particular website on the World Wide Web of the Internet. (It should be understood that the particular bar code depicted in FIG. 1 is provided for purposes of illustration only and does not literally represent any particular data.) So configured, the optical code comprises a machine readable code that is not easily viewed and understood by a human but that at least including information that identifies an information contact point.

Figure 2:
FIGS. 2–11 each comprise a top plan view of various embodiments configured in accordance with the invention.

After having converted the desired data into an appropriate machine readable optical code, such as the bar code described above, and referring now to FIG. 2, the optical code is combined with a delineator 11 ("combine" means that at least portions of the optical code share common X-Y coordinates with the delineator; it is preferred that at least 20% of the optical share share such common X-Y coordinates with the delineator). In all embodiments of this invention, the delineator is visible to the unaided human eye. In this particular embodiment, the delineator 11 comprises a line depiction of Australia. It should be understood that the delineator 11 could be comprised of virtually any visible graphic or figure, though delineators that are comprised substantially of alphanumeric representations alone are not preferred. The purpose of the delineator 11 is to delineate the location and/or purpose of the optical code 10 corresponding thereto for purposes that will be made more clear below. It will be appreciated that, while the optical code 10 is presented in a rectangular form factor, the delineator 11 is presented in a substantially non-rectangular form factor. In the embodiment depicted in FIG. 2, the substantially non-rectangular form factor of the delineator 11 partially includes the bar code 10.

Figure 3:
Figure 4:
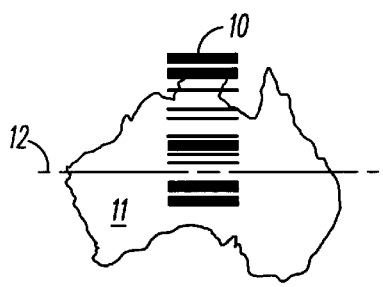

Referring to FIG. 3, in this embodiment, the delineator 11 fully includes the optical code 10, such that 100% of the optical code 10 shares common X-Y coordinates with the delineator 11. The delineator has a major axis denoted, in FIG. 3, by the reference numeral 12. In this particular embodiment, the optical code 10 has been orientated substantially parallel to this major axis 12 of the delineator 11. Referring to FIG. 4, it can be seen that the optical code 10 may also be orientated normal to this major axis 12. Other angular orientations are also possible, and may be desirable depending upn the particular intended application.

Figure 5:
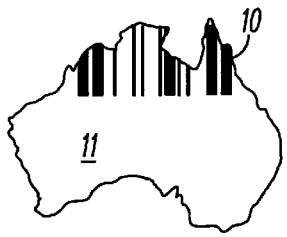

Referring now to FIG. 5, in this embodiment, the optical code 10 is not presented in a rectangular form factor as described above. Rather, the optical code 10 is presented in a form factor that at least partially conforms to a non-rectangular portion of the delineator 11 form factor. In this particular embodiment, such conformation is achieved by having the upper portions of the optical code 10 contact the upper periphery of the delineator 11. Other positioning of the optical code 10 will achieve a similar result with respect to the form factor as well. Also, it should be understood that the optical code 10 could be formed to conform to the delineator 11 form factor while yet remaining physically offset therefrom.

Figure 6:
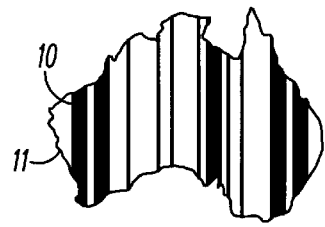
Figure 7:

With reference to FIG. 6, the optical code 10 can be configured to substantially conform to the delineator 11 form factor. Again, this conformation can be achieved through contact of the optical code 10 with the periphery of the delineator 11, or by offsetting (not shown) the periphery of the optical code 10 with respect to the periphery of the delineator 11. The periphery of the delineator 11 may comprise a substantially solid periphery as depicted in FIG. 6, or a non-solid periphery as depicted in FIG. 7.

Figure 8:

Referring to FIG. 8, the delineator 11 can be formed in its entirety of the optical code 10 itself by using the optical code 10 to define the periphery of the delineator 11. It is important to note that, even in this configuration, the delineator 11 still exists to not merely determine the peripheral boundary of the optical code 10 but to also convey information regarding the location and/or function or purpose of the optical code 10 information.

Figure 9:
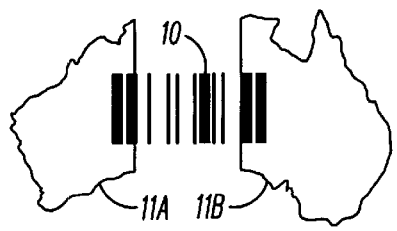

Referring to FIG. 9, the delineator 11 can itself be comprised of more than one discrete component. For example, as depicted for purposes of illustration, the delineator can be comprised of at least two separate discrete components 11A and 11B that are physically separated from one another. Again, in accordance with the teachings of the invention, these delineator elements are physically combined with the optical code 10 itself.

Figure 10:
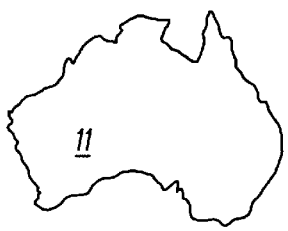

It should be understood that while the delineator 11 is visible to the unaided human eye, and while the optical code 10 is machine readable, it is not necessary to the practice of the invention that the optical code 10 itself be visible to an unaided human eye. For many applications, it may be preferred that the optical code 10 be non-visible to an unaided human eye. This can be accomplished in a variety of ways, including use of an ink that is not substantially visible in full-spectrum white light, such as an ink that has an infrared signature. Presenting the optical code 10 in this way will result in a visible presentation of the delineator 11 to the unaided human eye, without visual presentation of the optical code 10 itself as depicted in FIG. 10.

Figure 11:
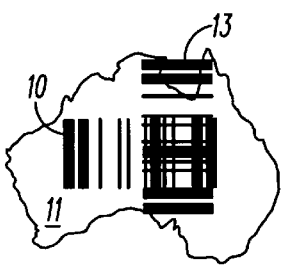

Depending upon the application, it may also be desirable to provide more than one optical code in combination with the delineator 11. For example, with reference to FIG. 11, a second machine readable optical code 13 (where again the optical code provided represents data) can be combined with at least the delineator 11 in any of the ways described previously. Further, if desired, and depending upon the application, the second optical code 13 can be combined with both the delineator 11 and the first optical code 10.

In all of the embodiments described, the delineator 11 and the optical codes 10 and 13 are presented on a display surface in physical combination with one another, which is to say, they share at least some common X-Y coordinates on the display surface. The display surface can be any appropriate display surface depending upon the application, including paper, plastic, cathode-ray tubes, liquid crystal displays, projection surfaces, and so forth.

So configured, the delineator functions to provide information to a user regarding the location of the corresponding optical code 10 and/or the purpose and/or function of the data contained within the optical code 10 (such as a task that can be initated, which task possibly uses other data that is pertinent to the user). For example, the embodiments depicted could be used in a magazine advertisement for Australia. The delineator 11 gives notice to the user of the location of the optical code 10 (particularly in circumstances where the optical code 10 is provided in a non-visible format). The shape and content of the delineator 11 itself also provides notice, in this example, to the user that the optical code 10 associated therewith relates to Australia itself. Since in this embodiment the optical code 10 includes identifying information to identify an information contact point, such as, in this example, a universal resource locator for an Australian tourism website, then by recovering the data in the optical code in a known manner and using that data to direct an appropriate internet interface device or devices, the user can obtain convenient and relatively transparent access to the tourism website delineated by the delineator 11.

What is claimed is:

1. A bar code, comprising:

a plurality of bars, each bar having a length and a width;

wherein the widths of the bars varies in order to represent the bar code; and wherein the lengths of the bars varies in a configuration that conforms to a delineator form factor of a specific item for identifying the item shape such that a viewer can identify the bar code meaning without having a bar code reading device and for conveying information regarding the bar code.

2. A bar code according to claim 1, wherein the bar code includes a substantially solid periphery and is circumscribed by said substantially solid periphery.

3. A bar code according to claim 2, wherein at least a portion of the bar code is non-visible to an unaided human eye.

4. A bar code according to claim 3, wherein the bar code is formed at least in part using an ink that is not substantially visible in full-spectrum white light.

5. A bar code according to claim 4, further comprising an ink that has an infrared signature.

6. A bar code according to claim 1, wherein the bar code includes a non-solid periphery and is circumscribed by said non-solid periphery.

7. A bar code according to claim 1, further comprising a delineator substantially parallel to a major axis of the bar code.

8. A bar code according to claim 1, further comprising a delineator substantially normal to a major axis of the bar code.

9. A bar code according to claim 1, further comprising a substrate that caries the bar code.

10. A bar code according to claim 1, further comprising a delineator that is visible to the unaided human eye, which delineator is displayed on the display surface.

11. A bar code according to claim 10, wherein the delineator has a non-rectangular form factor; and wherein the delineator at least partially includes the barcode.

12. A bar code according to claim 11, wherein the delineator fully includes the barcode.

13. A bar code according to claim 10, wherein the delineator has a non-rectangular form factor; and wherein the bars have lengths that at least partially conforms to a non-rectangular portion of the delineator form factor.

14. A bar code according to claim 13, wherein the barcode has a form factor that substantially conforms to the delineator form factor.

15. A bar code according to claim 10, wherein the delineator has a substantially solid periphery.

16. A bar code according to claim 10, wherein the delineator has a non-solid periphery.

17. A bar code according to claim 10, wherein the delineator is formed entirely of the barcode.

18. A bar code according to claim 10, wherein the delineator includes at least two separate discrete components that are physically separated from one another.

19. A bar code according to claim 10, wherein the barcode is oriented substantially parallel to a major axis of the delineator.

20. A bar code according to claim 10, wherein the barcode is oriented substantially normal to a major axis of the delineator.

21. A bar code according to claim 1, further comprising another machine-readable optical code, which said another machine-readable optical code is not easily viewed and understood by a human, and which said another machine-readable optical code is displayed on the display surface in physical combination with the delineator.

22. A bar code according to claim 21, wherein the another machine-readable optical code is physically combined with the bar code.

23. An article having a bar code on a surface thereof, wherein the bar code comprises:

a plurality of bars, each bar having a length and a width;

wherein the widths of the bars varies in order to represent the bar code; and wherein the lengths of the bars varies in a configuration that conforms to a delineator form factor of a specific item for identifying the item shape such that a viewer can identify the bar code meaning without having a bar code reading device and for conveying information regarding the bar code.

24. A method of forming a bar code, comprising the steps of:

(a) determining a code to be represented by the bar code and an image to be formed by the bar code;

(b) establishing widths of a plurality of bars in order to represent the bar code;

(c) establishing lengths of the plurality of bars in a configuration that conforms to a delineator form factor of a specific item for identifying the item shape such that a viewer can identify the bar code meaning without having a bar code reading device and for conveying information regarding the bar code; and (d) rendering a plurality of the bars to make up the bar code.

25. A method according to claim 24, further comprising the step of rendering a delineator with the bar code.

26. A method according to claim 25, further comprising the step of establishing the delineator in a non-rectangular form factor that at least partially includes the barcode.

27. A method according to claim 25, further comprising the step of establishing the delineator in a form factor that substantially conforms to the bar code.

28. A method according to claim 25, further comprising the step of establishing the delineator in a non-rectangular form factor that fully includes the barcode.

29. A method according to claim 28, wherein the step of establishing the delineator in a non-rectangular form factor includes the step of providing the non-rectangular form factor with a substantially solid periphery.

30. A method according to claim 28, wherein the step of establishing the delineator in a non-rectangular form factor includes the step of providing the non-rectangular form factor with a non-solid periphery.

31. A method according to claim 24, wherein the step of rendering the bar code renders a delineator with the bar code by providing a delineator that is formed entirely by the bar code.

* * * * *